Sept. 1, 1959　　　E. R. PRICE ET AL　　　2,902,008
POWER-ASSISTED ACTUATOR
Filed June 6, 1955　　　　　　　　　　2 Sheets-Sheet 1

INVENTORS
EARL R. PRICE
EDWARD E. HUPP
BY William P. Hickey
ATTORNEY

Sept. 1, 1959     E. R. PRICE ET AL     2,902,008
POWER-ASSISTED ACTUATOR

Filed June 6, 1955     2 Sheets-Sheet 2

INVENTORS
EARL R. PRICE
EDWARD E. HUPP

BY William P. Hickey
ATTORNEY

United States Patent Office 2,902,008
Patented Sept. 1, 1959

2,902,008
POWER-ASSISTED ACTUATOR

Earl R. Price and Edward E. Hupp, South Bend, Ind., assignors to Bendix Aviation Corporation, South Bend, Ind., a corporation of Delaware Application June 6, 1955, Serial No. 513,514

19 Claims. (Cl. 121—41)

The present invention relates to an improvement in power-assisted actuators, i.e., pressure producing devices in which physical force is supplemented by power assistance. Although the improved actuator has been devised primarily for use in vehicle braking systems, other uses are possible.

This invention relates to an improvement over Price Patent 2,685,170 and Price appication Serial No. 454,797, filed September 7, 1954. In the above mentioned cases several embodiments of "poppet" type valve control structure are disclosed for controlling the pressure differential across a pressure responsive movable wall in a power-assisted actuator.

In addition to the advantages of the control valves of the above mentioned Price patent and application, there is a constant demand for more efficient valve control structure for power-assisted actuators. Poppet valves in these devices afford highly desirable sealing characteristics, however, factors such as positive valve actuation, valve leakage, valve flutter or "hunting," and friction loss between relatively movable parts are but a few of the problems to be solved in power-assisted brake systems.

Thus it is a principal object of this invention to provide a power-assisted actuator for use in vehicle braking systems including improved valve structure wherein the rotary motion of a pivotally supported member is simply and efficiently transferred into reciprocatory motion for operating a poppet valve.

It is another object of this invention to provide improved valve control structure for power-assisted actuators for use in vehicle brake systems wherein a flexible cable is used to transfer rotary motion of a valve control member to a poppet valve guided for reciprocatory motion.

Another object of this invention is to afford in a vacuum suspended power-assisted actuator improved control valve mechanism having improved control characteristics and including a valve port, a poppet valve adapted to close said port, and means carried by said poppet valve and adapted to meter the flow through the port when the poppet valve is moved to its open position.

Still another object of this invention is to provide in a power-assisted actuator of the vacuum suspended "poppet" type for use in a vehicle brake system valve control structure which minimizes valve flutter and "hunting" affording smooth, efficient and positive valve actuation.

Other objects and advantages of this invention will become apparent from a consideration of the following description, taken in connection with the accompanying drawings wherein several embodiments of the invention are disclosed by way of example.

Figures 1, 6:
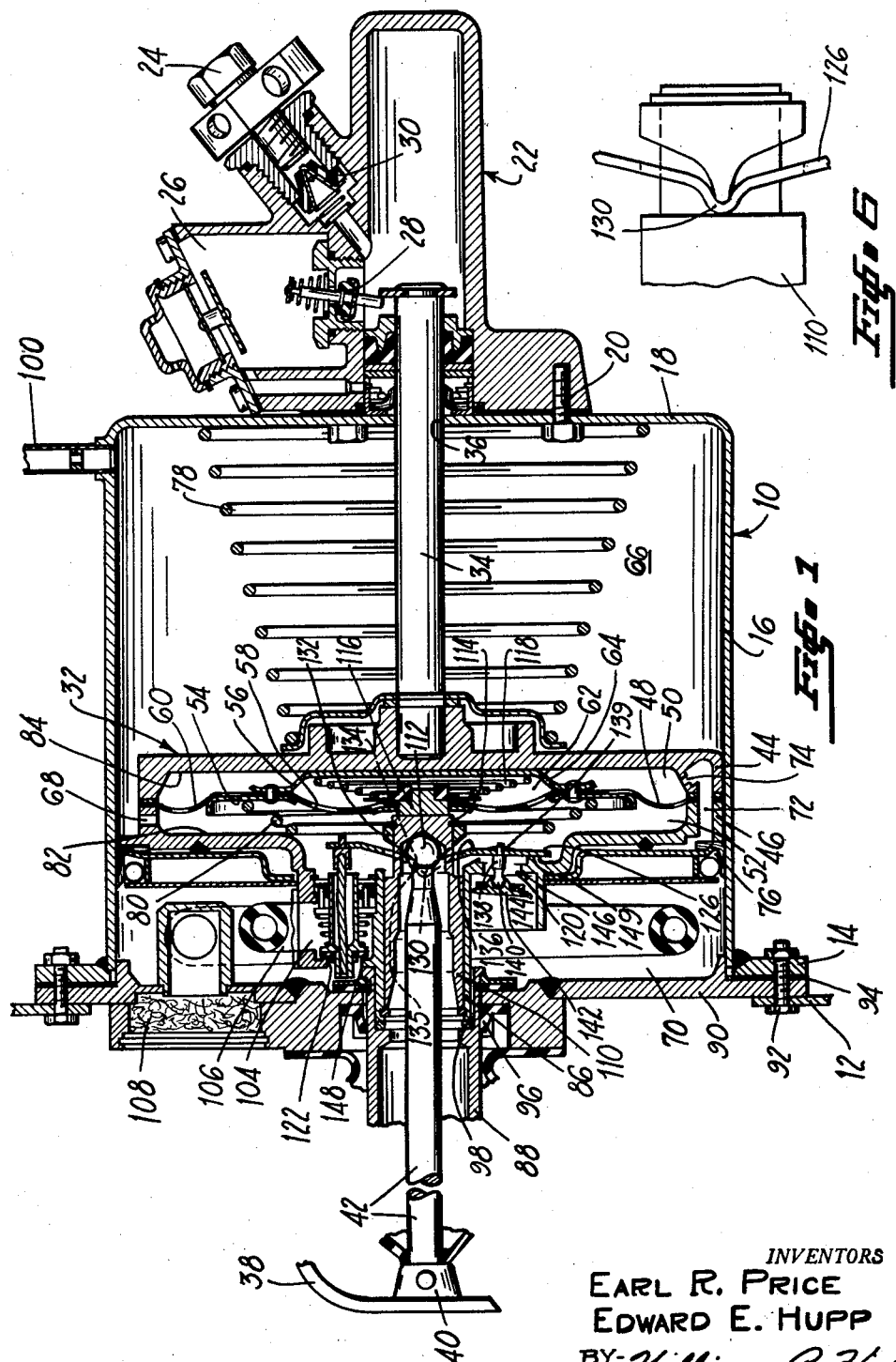
Figure 1 is a sectional view of the power-assisted actuator.
Figure 2:
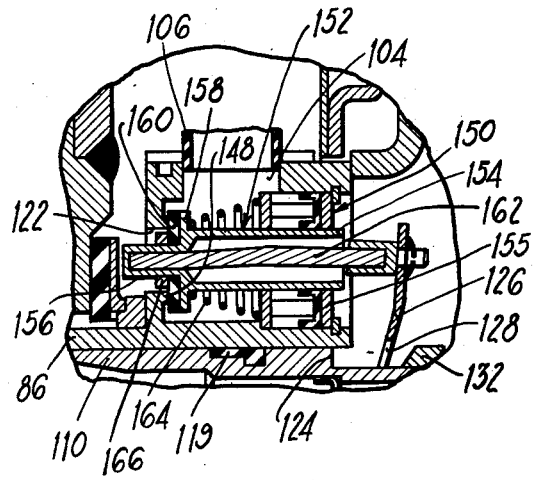
Figure 2 is an enlarged view of a portion of Figure 1 disclosing more clearly the valve control structure.
Figure 3:
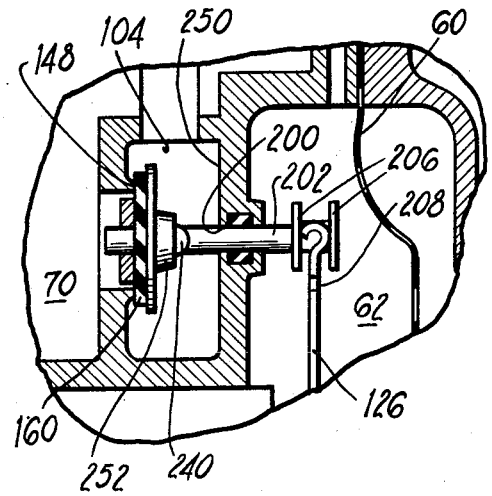
Figure 4:
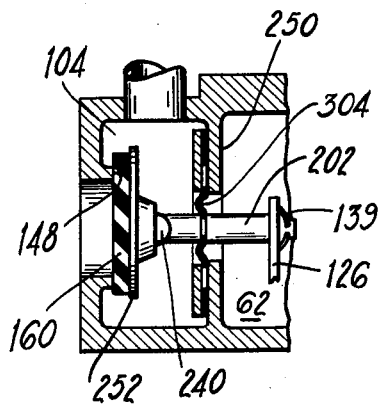
Figure 5:
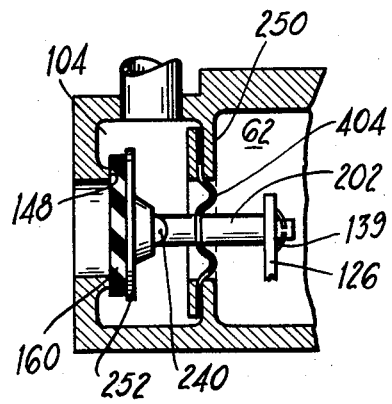
Figure 7:
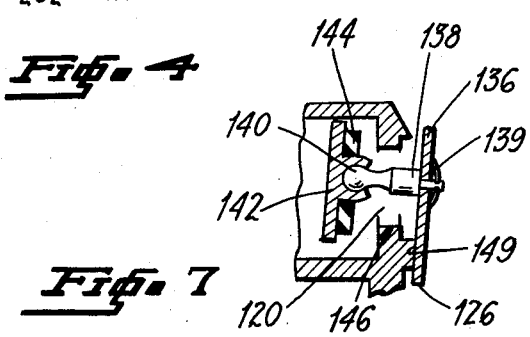

Figures 3, 4, and 5 are fragmentary views of structure similar to that disclosed in Figure 2 showing other embodiments of the novel valve structure;

Figure 6 is a fragmentary side elevational view showing the connection between the pivotal valve carrying member 126 and the valve control member 110; and Figure 7 is an enlarged fragmentary cross sectional view showing the connection between the pivotal valve carrying member 126 and the poppet member 142.

Referring to the drawings, the illustrated power-assisted actuator 10 of this invention is suitably secured to the toeboard of firewall 12 of a vehicle by means of an outwardly extending flange 14 formed on one end of a power cylinder casing 16. On the other end 18 of power cylinder 16 there is secured by suitable means, such as screws 20, only one of which is shown, a hydraulic cylinder 22 provided with an outlet 24 for connection to the wheel cylinders, not shown, of a conventional hydraulic brake system, illustrated diagrammatically for example in the Price Patent 2,685,170. A fluid reservoir 26 is in communication with the hydraulic cylinder 22, said communication being controlled by a "tilting valve" 28, the operation of which is more fully described in the aforementioned Price patent. The outlet 24 includes a residual check valve structure 30 for maintaining a residual line pressure in the brake system. A power piston 32 is reciprocably carried inside power cylinder 16, and a plunger or pressure-transmitting member 34 is co-axially secured to said piston 32 and projects through an opening 36 in the power cylinder end 18 and into the hydraulic cylinder 22.

Thus it is seen that by movement of piston 32 to the right, plunger 34 is driven more deeply into hydraulic cylinder 22 and displaces fluid through the outlet 24. Movement of the power piston is controlled by means of a treadle 38 which is pivoted on the floor 12 at the upper end (this connection not being shown, and connected at the lower end 40 to a rod 42, having an operative connection with piston 32. By depressing treadle 38, the connecting rod 42 will be forced to the right and will in turn cause movement of piston 32 toward the right, causing plunger 34 to displace liquid from hydrauilc cylinder 22. This particular sequence of manual operation applies only during "power-off" conditions and should not be confused with the normal desired power assisted operation in which the treadle 38 is used to actuate the valve control structure of the power device which will cause actuating movement of the piston 32.

Continuing now with the detailed description of the structure, the piston 32 comprises essentially two sections 44 and 46 which are joined at their outer peripheries in such a manner as to provide an internal piston cavity. A diaphragm 48 is clamped between the two piston sections 44 and 46 to provide two variable volume piston compartments 50 and 52. The central portion of diaphragm 48 is clamped between plate members 54 and 56 and provides flexible, annular, inner and outer diaphragm portions 58 and 60, respectively, which can move relative to piston 32. The plate member 56 forms with diaphragm portion 58 an additional internal chamber 62 which communicates with chamber 50 through a restricting orifice 64 giving rise to the "anti-flutter" function described in detail in Hupp Patent 2,690,740. Compartment 52 is in continuous communication with a power chamber 66 in front of the piston 32, through a passage 68. Compartment 50 is constantly in communication with a rear or control chamber 70 by means of a suitable passage 72 including a restricted orifice 74, the function of which will be subsequently described in detail. Suitable seal means such as that shown at 76 is provided on the outer periphery of the piston 32 to prevent leakage between chambers 66 and 70, and a power piston return spring 78 is interposed between end 18 of the power cylinder and the power piston 32 and serves to return said power piston to the extreme left.

A counter-reaction spring 80 is located in chamber 52 between plate 54 and the opposite inner wall portion 82 of piston 46 serving to bias the plate member 56 against the inner wall portion 84 of piston 32 which forms one wall of chamber 50. This diaphragm structure and counter-reaction spring is substantially the same as that described in greater detail in the co-pending Price application Serial No. 411,386, filed February 19, 1954, now Patent 2,818,710.

Section 46 of the piston 32 includes an integral tubular extension 86 to which is secured as by a press fit a tubular sleeve member 88 which extends out of the power cylinder casing through an end plate 90. The end plate is secured to flange 14 of the power cylinder by any suitable means, such as bolts 92, which also secure the power cylinder to the toe-board 12. Interposed between the end plate 90 and flange 14 is a suitable seal gasket 94 which forms a vacuum tight seal therebetween.

The previously mentioned Price patent and application disclose power actuators known in the art as "atmosphere suspended" units, however, the power actuator shown in this application is known in the art as a "vacuum suspended" unit because the power piston 32 is subject to vacuum on both sides during periods of non-braking. The source of power of this embodiment is intended to be manifold vacuum, however, any other suitable source of vacuum could be utilized. Inasmuch as the unit is "vacuum suspended" it is important that atmosphere leakage in the unit be reduced to a minimum and accordingly suitable seal means, such as a "lip" seal member 96, is provided between the sleeve 88 and the end plate 90. This seal permits reciprocal movement of the sleeve 88 in the end plate when the integral sleeve 86 to which the sleeve 88 is secured moves with the power piston 32. Additional seal means, such as the O-ring 98 is provided between the tubular extension 86 and tubular sleeve 88 insuring against leakage to the atmosphere through the interior of sleeve 88.

Power cylinder 16 includes a conduit 100 which is in communication with a suitable source of vacuum, such as an engine manifold, not shown. Interposed in conduit 100 between the power cylinder 16 and the source of vacuum is a one-way check valve (not shown), operable to trap vacuum in chamber 66 in the event of an engine failure and loss of engine manifold pressure. This check valve thus provides the safety factor of several power applications of the brakes in spite of loss of vacuum of the engine manifold.

Included in piston portion 46 is an atmosphere chamber 104 in communication with a flexible hose 106 connected to the atmosphere through a suitable air cleaner 108 which is mounted on end wall 90. The flexible hose permits reciprocable movement of the power piston 32 in a manner well known in the art.

Contained in the tubular extension 86 is a reciprocable hollow valve control member 110 in which the rounded end 112 of the rod member 42 is swivelly secured in any suitable manner. Valve control member 110 includes a reduced diameter portion 114 which is in contact with a diaphragm mounting assembly 116 centrally secured to the inner diaphragm portion 58. This assembly 116 has interposed between it and member 56 a valve spring 118 urging the assembly 116 into contact with the valve control portion 114. Thus a pressure differential developed across diaphragm portion 58 urging it toward the left will be felt by the operator of the device through rod 42 and treadle 38. Since the vacuum exists in chamber 62 during non-braking conditions, when the device is "vacuum suspended," and atmospheric pressure exists inside valve control member 110, a pressure differential exists on member 110 tending to urge it toward a valve actuating position, however, valve spring 118 is of sufficient strength to prevent such valve actuation.

Valve control member 110 includes on its outer periphery suitable seal means 119 which permits reciprocable movement between member 86 and 110 and prevents leakage from chamber 52 to the atmosphere through the interior of member 88.

The piston portion 46 includes two control ports 120 and 122. Port 120 controls communication between chambers 52 and 70 wherein port 122 controls communication between the atmosphere chamber 104 and chamber 70. In a non-braking condition communication between chambers 104 and 70 through port 122 is prevented by suitable valve control mechanism, to be subsequently described, and chamber 70 will be in communication with chambers 52, 50, and 66 through port 120 passage 72 and passage 68, respectively.

Pivotally mounted on a shoulder 124 formed by the reduced diameter valve control portion 114 is a pivotal valve carrying member 126 including a central aperture 128 through which portion 114 extends. Member 126 includes two pivotal leg portion 130 (only one being shown) which are held in contact with shoulder 124 by means of a pivot washer 132 which also includes two pivot legs 134 (only one being shown) in contact with the pivot legs 130 at 135.

Pivotal valve carrying member 126 has secured near its one end 136 a poppet carrying member 138 which is secured thereon, for example, by means of a Tinnerman fastener 139. The opposite end 140 of the poppet carrying member 138 is rounded and has swivelly secured thereon the poppet member 142 which includes a resilient seating portion 144 which cooperates with the valve seat 146 contained on the peripheral edge of port 120. The swivel connection of poppet member 142 on member 138 permits the poppet member to seat on its cooperating valve seat in spite of eccentricities of construction and also accommodates for the pivotal path of the pivotal member 126 which controls movement of said poppet member. Included on piston portion 46 in the pivotal or arcuate path of the end 136 of the pivotal member 126 is an abutment portion 149, the function of which will be subsequently described in the operation of the valve structure.

Atmosphere chamber 104 includes on one wall, the control portion 122 which contains the peripheral valve seat 148 inside the chamber 104. The opposite side of chamber 104 includes a poppet valve support and double lipped sealing assembly 150 which reciprocably supports poppet valve member 152. The poppet valve member 152 includes a tubular hollow extension 154 which is reciprocably guided in two washer members 155 of the poppet valve support and sealing assembly 150, and which terminates in a reduced diameter portion 156 and has a circumferential flange 158. Adjacent the flange 158 on portion 156 is a resilient sealing material 160 which is operable to be urged into sealing relationship with valve seat 148. Firmly secured inside the resduced diameter portion 156 of the poppet valve member 152 at one end is a relatively stiff yet flexible cable member 162 which passes inside the tubular extension 154 and the poppet member member and which has its outer end secured to the pivotal valve member 126 by means of a Tinnerman fastener, for example. The end of the pivotal valve member 126 to which the cable 162 is attached describes an arcuate path during its pivotal movement and the cable member 162 compensates for such movement relative to the poppet member 152, due to its inherent flexibility.

Interposed between flange 158 and assembly 150 is a spring member 164 which urges the poppet valve member toward the valve seat 148.

Mounted adjacent the resilient sealing material 160 on the reduced diameter portion 156, although not absolutely essential, is a relatively thin fluid metering element 166 which is of a diameter slightly less than that of the control port 122.

Operation of the power actuated structure heretofore described is as follows:

As previously explained the power actuator is initially vacuum suspended. During a brake application wherein force is exerted on rod 42 by the operator at treadle 38 there is caused rightward movement of the valve control member 110. This rightward movement, after valve spring 118 is overcome, causes the poppet member 142 to be seated on its valve seat 146 thus closing off communication between chamber 70 and chambers 52 and 66. During this initial movement the pivotal valve carrying element 126 is exerting no force at its upper end to pull the valve 152 off its valve seat 148. After the lower poppet 142 has become seated, continued rightward movement of the valve control element 110 causes a force to be exerted on cable 162 through the pivotal valve element 126 resulting in the "cracking" of the poppet valve 52 which controls the admission of atmospheric pressure into chamber 70 through control port 122. During the initial cracking of valve element 152, the admission of atmosphere is metered by virtue of the restriction of port 122 due to metering element 166. Upon the entrance of atmosphere into chamber 70 a pressure differential will exist across the power piston 32 which urges the power piston in a rightward direction resulting in the transmission of force through the plunger 34 providing the displacement of fluid in hydraulic cylinder 22 and through the outlet 24 ot the wheel brake cylinders in the usual manner.

The admission of atmosphere from chamber 104 into chamber 70 also results in the admission of atmosphere through the restricting orifice 74 into chamber 50 and finally through the restricting orifice 64 into chamber 62. By virtue of the closing of poppet 142, as previously explained, chamber 52 contains vacuum pressure in which the unit was originally suspended. Thus a pressure differential exists over diaphragm portion 58 which is available to immediately apprize the operator of the device of the amount of force exerted by virtue of the pressure differential existing across the power piston 32. As described in greater detail in the co-pending Price application Serial No. 411,386, filed February 19, 1954, supra, this reaction exerted by the diaphragm portion 58 apprizes the operator of the device of the initial force comparable to that required to take up the initial clearances between the brake shoes and brake drums. After sufficient pressure differential is built up across the diaphragm member, the counter reaction spring 80 is overcome and the operator of the device is apprized of a force proportional to that being exerted by the power piston 32.

After a given brake application inasmuch as the valve seat 148 is an integral part of the power piston portion 46, rightward movement of the power piston 32 results in the valve seat 148 coming into contact with the poppet 152 in which is termed in the art as a "lapped" condition wherein each of the poppets are seated on its respective valve seat.

Rightward movement of the power piston 32 results in the compression of return spring 78 in the manner well known in the art. Upon the release of operator applied pressure on the treadle 38, the return spring 78 urges the power piston toward the left in a position illustrated in Figure 2. Upon the release of operator applied pressure, the valve spring 118 through the contact between portions 114 and 116 presents a force urging the valve control member 110 toward the left or a non-braking condition. The leftward movement of the valve control member 110 and the pivotal member 126 carried thereon results in a force being transmitted through the cable 162 urging the poppet 152 to its seated position as illustrated. Seating of the poppet 152 results in the pivotal valve member 126 pivoting about its upper end and continued force urges the poppet 142 off its valve seat 146. It will be observed that the abutment portion 149 is in the pivotal path of the lower end of the pivotal valve member 126 so that the lower end 136 upon contacting abutment 149 results in the pivot of the valve member 126 again changing so that any additional force exerted by the spring 118 causes the pivotal valve member 126 to pivot about abutment 149, and thus urge the poppet 152 into greater sealing relationship with its valve seat.

During the pivotal movement of the pivotal valve element 126 the flexible cable 162 has compensated for the circular path taken by the upper portion of said pivotal member relative to the poppet 152. The poppet spring 164 is provided in chamber 104 to insure the positive seating of the poppet valve 152.

By virtue of the metering element 166, the initial "crack" of the valve 152 may be controlled, in conjunction with the restricted orifices 74 and 64, the initial entrance of atmosphere into chambers 50 and 62 is somewhat diminished thus preventing an objectionable diaphragm flutter which might cause the operator of the device to over-compensate by making an excessive brake application. The metering element 166 in conjunction with the restricting orifices just mentioned permits a fine degree of valve control during initial actuation, however, this refinement may be omitted if such a degree of control is not dictated.

The embodiments disclosed in Figures 3, 4, and 5 operate in substantially the same manner as the modification previously described and disclosed in Figures 1 and 2, the difference being principally in the poppet valve structure for controlling the admission of atmosphere into chamber 70. In these embodiments the structure similar to that of Figures 1 and 2 will be identified by similar reference characters.

The embodiment of Figure 3 discloses an atmosphere chamber 104, the passage of atmosphere from chamber 104 to chamber 70 being controlled through port 122 which includes a valve seat 148. The wall 250 of chamber 104 opposite port 122 includes an opening 200 in which the stem 202 of poppet valve member 252 is reciprocably mounted. The opening contains suitable seal means 204 to prevent leakage about the stem 202 between chambers 104 and 62. The valve assembly is actuated in the manner similar to that disclosed in Figures 1 and 2, however, the connection between the pivotal valve member 126 and the stem 202 of the poppet valve member 252 is modified to compensate for the longitudinal movement of stem 202 and the curvilinear path of the upper end of member 126 when said member is pivoted. Stem 202 includes on its end in chamber 62 two spaced washer members 206 which are secured thereon in any suitable manner. Slidable between these two washer members is the upper end of member 126 which takes the configuration of a "yoke" having two spaced leg-like members 208 (only one being shown), whereupon pivotal movement of member 126 results in said "yoke" member sliding between the washer members 206 without loss of motion, providing positive actuation of the valve setructure. Provided between poppet valve member 252 and stem 202 is connection 240, which is similar to the swivel connection disclosed at 140 in Figure 2, and which insures proper valve seating of the poppet valve member 252 in the event misalignment of assembly occurs during manufacturing.

In Figure 4 the construction is similar to that of Figure 3, however, the stem 202 of the poppet valve member 252 is solidly connected to pivotal valve member 126 by means of a Tinnerman fastener, for example, in a manner similar to that disclosed in Figures 1 and 2. The swivel connection 240 of this embodiment will permit the stem 202 to follow the curvilinear path of the upper end of valve member 126. Secured to wall 250 of chamber 104 and stem 202 of this embodiment is a flexible seal 304 which permits angular movement of the stem 202 due to the curvilinear movement of member 126. This seal also prevents leakage between chambers 104 and 62.

The embodiment of Figure 5 is somewhat simliar to that of Figure 4, however, there is provided between wall 250 and stem 202 a flexible diaphragm sealing and balancing member 404 which permits free angular movement of stem 202 as well as preventing leakage between chambers 104 and 62, and in addition providing means to counter balance the poppet load on poppet member 252. This function is comparable to that disclosed in the previously mentioned Price application 454,797 filed September 7, 1954. Since chamber 104 contains atmosphere during a non-braking condition and chambers 70 and 62 contain a vacuum, a pressure differential exists across poppet 252 urging the poppet toward the valve seat 160. Since a pressure differential also exists across the diaphragm 404 in a direction opposite to that just described, which tends to urge the poppet off its valve seat, by controlling the relative sizes and effective areas of the poppet 252 and the diaphragm 404 it is possible to substantially balance the poppet off its seat and thus reduce the initial "crack point" of the valve.

In the foregoing specification and appended claims, the identified terms are used to convey meanings which include the range of equivalent elements. The terms "front" and "rear" or any other directional terms are intended to have only a relative connotation to aid in describing the device and are not intended to be interpreted as requiring any particular orientation with any external elements.

Although a particular embodiment of the invention has been illustrated and described other changes and modifications will be apparent to those skilled in the art. All changes and modifications falling within the scope of the claims are intended to be claimed.

We claim:

1. In a fluid pressure device comprising a power cylinder having a vacuum suspended pressure responsive movable wall reciprocable therein, said wall having a hollow interior, diaphragm means dividing said interior into first and second differential pressure chambers, the first chamber being in communication with the rear of said wall and the second chamber being in communication with the front of said wall, said movable wall including a third chamber spaced rearwardly of said second differential pressure chamber and containing a pressure fluid medium for creating a pressure differential across said pressure responsive movable wall and between said interior chambers, a valve control assembly reciprocably carried by said movable wall including a walking beam positioned in said second fluid pressure chamber, a control port including a forwardly facing valve seat in said third chamber providing communication between said third chamber and the rear of said pressure responsive movable wall, poppet valve means for abutting said valve seat and including a portion projecting into said second differential pressure chamber, said diaphragm means being constructed and arranged to exert a force rearwardly against said control assembly generally in proportion to the differential pressure across said movable wall, means providing a seal between said portion of said poppet member and said movable wall to separate said third chamber from said second differential pressure chamber, and means pivotally connecting said poppet member to said walking beam, one of said means being flexible to accommodate both the radial and axial movement of said walking beam.

2. In a fluid pressure device as set forth in claim 1 wherein said motion compensating means includes a flexible cable connected to said poppet valve means and said pivotal member.

3. In a fluid pressure device as set forth in claim 1 wherein said motion compensating means includes a slidable connection between said poppet valve means and pivotal member.

4. In a fluid pressure device as set forth in claim 1 wherein said motion compensating means includes a flexible seal member provided about said poppet valve means and wherein said poppet valve member is fixedly secured to said pivotal member.

5. In a fluid pressure device as set forth in claim 4 wherein said flexible seal consists of a pressure responsive flexible diaphragm.

6. In a fluid pressure device as set forth in claim 1 wherein the portion of the poppet valve assembly extending between the third and second chambers has a slidable connection with the end of the pivotal member of the valve control assembly, wherein seal means is included about said extending portion to prevent leakage of pressure between the third and second chambers.

7. In a fluid pressure device as set forth in claim 1 wherein the portion of the poppet valve assembly extending between the third and second chambers is fixedly secured to the pivotal member of the valve control assembly and wherein a flexible seal member is provided about said extending portion to prevent leakage of pressure between the third and second chambers and to permit said extending portion to follow the arcuate path of the pivotal member.

8. In a fluid pressure device as set forth in claim 1 wherein the portion of the poppet valve means extending between the third and second chamber is rigidly secured to the pivotal member of the valve control assembly and wherein a flexible pressure responsive diaphragm is provided about said extending portion forming a portion of the wall of the third chamber, said pressure responsive flexible diaphragm permitting the poppet valve assembly to follow the arcuate path of the pivotal member and further providing a force to substantially balance the poppet valve assembly off its valve seat.

9. In a fluid pressure device as set forth in claim 1 wherein yieldable means is provided in said third chamber urging said poppet valve assembly toward its valve seat.

10. In a fluid pressure device as set forth in claim 9 wherein the portion of the poppet valve assembly extending between the third and second chamber has a slidable connection with the end of the pivotal member of the valve control assembly, wherein seal means is included about said extending portion to prevent leakage of pressure between the third and second chambers.

11. In a fluid pressure device as set forth in claim 9 wherein the portion of the poppet valve assembly extending between the third and second chambers is fixedly secured to the pivotal member of the valve control assembly and wherein a flexible seal member is provided about said extending portion to prevent leakage of pressure between the third and second chambers and to permit said extending portion to follow the arcuate path of the pivotal member.

12. In a fluid pressure device set forth in claim 9 wherein the portion of the poppet valve means extending between the third and second chamber is rigidly secured to the pivotal member of the valve control assembly and wherein a flexible pressure responsive diaphragm is provided about said extending portion forming a portion of the wall of the third chamber, said pressure responsive flexible diaghragm permitting the poppet valve assembly to follow the arcuate path of the pivotal member and further providing a force to substantially balance the poppet valve assembly off its valve seat.

13. In a fluid pressure device as set forth in claim 1 wherein a fluid metering means is carried by the poppet valve assembly to control the amount of pressure differential fluid from the third chamber into the power cylinder during initial valve crack of the valve assembly.

14. In a fluid pressure device as set forth in claim 13 wherein said fluid metering means comprises a relatively thin circular member mounted on said poppet valve means, said circuit member extending into said control port and being of a smaller diameter than said control port.

15. In a fluid pressure device as set forth in claim 14 wherein the communication between said first chamber and the rear of said pressure responsive movable wall includes therein orifice means, said means which divide the interior of said pressure responsive movable wall into the first and second variable volume chambers having a plate member secured thereto and forming therewith a chamber contained in said first chamber in communication with said first chamber through an additional orifice means.

16. A servo-motor comprising: a power chamber enclosure; a movable wall in said power chamber dividing the chamber into opposing fluid pressure chambers, and said movable wall being constructed and arranged for axial movement within said enclosure; a valve chamber in said movable wall communicating with a first source of fluid pressure; a valve port communicating said valve chamber with one of said opposing chambers; an axially extending poppet in said valve chamber extending externally of said valve chamber; a control member movable axially with respect to said movable wall and spaced radially from said poppet; a radially extending lever for transferring axial motion of said control member to said poppet; means providing a seal between said poppet member and said movable wall for said valve chamber; and means connecting said radially extending lever to said poppet, one of said means being flexibly constructed to accommodate both radial and axial movement of said radially extending lever during its actuation of said poppet.

17. In a fluid pressure device comprising a power cylinder having a vacuum suspended pressure responsive movable wall reciprocable therein, said wall having a hollow interior, diaphragm means dividing said interior into first and second differential pressure chambers, the first chamber being in communication with the rear of said wall and the second chamber being in communication with the front of said wall, said movable wall including a third chamber containing a pressure fluid medium for creating a pressure differential across said pressure responsive movable wall and between said interior chambers, a valve control assembly reciprocably carried by said movable wall including a pivotal member, a control port including a valve seat in said third chamber providing communication between said third chamber and the rear of said pressure responsive movable wall, poppet valve means operatively associated with the pivotal member and said control port valve seat operable to control the pressure differential across said pressure responsive movable wall, said diaphragm means being constructed and arranged to exert a force rearwardly against said control assembly generally in proportion to the differential pressure across said movable wall, said poppet valve means including a hollow tubular portion extending between the third and second chambers and reciprocably supported in a sealing assembly operative to prevent leakage of pressure between the third and second chambers, and a flexible cable extending through said tubular portion and secured to the poppet valve means and to the pivotal member of the valve control assembly, and whereby said flexible cable accommodates arcuate movement of the pivotal member during valve actuation.

18. In a fluid pressure device comprising a power cylinder having a vacuum suspended pressure responsive movable wall reciprocable therein, said wall having a hollow interior, diaphragm means dividing said interior into first and second differential pressure chambers, the first chamber being in communication with the rear of said wall and the second chamber being in communication with the front of said wall, said movable wall including a third chamber containing a pressure fluid medium for creating a pressure differential across said pressure responsive movable wall and between said interior chambers, a valve control assembly reciprocably carried by said movable wall including a pivotal member, a control port including a valve seat in said third chamber providing communication between said third chamber and the rear of said pressure responsive movable wall, poppet valve means operatively associated with the pivotal member and said control port valve seat operable to control the pressure differential across said pressure responsive movable wall, said diaphragm means being constructed and arranged to exert a force rearwardly against said control assembly generally in proportion to the differential pressure across said movable wall, said poppet valve means including a hollow tubular portion extending between the third and second chambers and reciprocably supported in a sealing assembly operative to prevent leakage of pressure between the third and second chambers, yieldable means provided in said third chamber urging said poppet valve assembly toward its valve seat, and a flexible cable extending through said tubular portion and secured to the poppet valve means and to the pivotal member of the valve control assembly and whereby said flexible cable accommodates arcuate movement of the pivotal member during valve actuation.

19. In a control valve: a housing having an internal axially extending valve chamber, a control member mounted in said housing to one side of said valve chamber for reciprocatory movement in a direction generally parallel with said axis and extending forwardly of said chamber, a forwardly facing valve seat in said valve chamber, a poppet member in said valve chamber for abutting said valve seat, said poppet member having a tubular extension projecting forwardly out of said valve chamber, a generally radially extending walking beam pivotally supported from said housing and extending forwardly of said tubular extension for transferring reciprocatory movement of said control member to said poppet member, generally stationary sealing means for said valve chamber engaging said tubular extension and providing a sliding seal therewith, and a flexible cable extending through said tubular extension with one end fastened to said poppet member and the other end fastened to said walking beam.

References Cited in the file of this patent

UNITED STATES PATENTS

| | | |
|---|---|---|
| 418,405 | Gibson | Dec. 31, 1889 |
| 1,373,199 | Neville | Mar. 29, 1921 |
| 1,921,092 | Newton | Aug. 8, 1933 |
| 1,992,048 | Temple | Feb. 19, 1935 |
| 2,221,459 | Sassen | Nov. 12, 1940 |
| 2,337,699 | Klimkiewicz | June 5, 1945 |
| 2,520,374 | Rockwell | Aug. 29, 1950 |
| 2,685,170 | Price | Aug. 3, 1954 |
| 2,704,956 | Johnson | Mar. 20, 1955 |
| 2,724,398 | Higgins | Nov. 22, 1955 |

UNITED STATES PATENT OFFICE

CERTIFICATE OF CORRECTION

Patent No. 2,902,008                                                           September 1, 1959

Earl R. Price et al

It is hereby certified that error appears in the printed specification of the above numbered patent requiring correction and that the said Letters Patent should read as corrected below.

Column 4, line 46, for "portion" read -- port --; line 58, for "resduced read -- reduced --; line 62, for "member", first occurrence, read -- valve -- column 5, line 30, for "ot" read -- to --.

Signed and sealed this 5th day of April 1960.

(SEAL)
Attest:

KARL H. AXLINE
Attesting Officer

ROBERT C. WATSON
Commissioner of Patents